United States Patent [19]

Dallas, Jr. et al.

[11] 4,378,569
[45] Mar. 29, 1983

[54] SOUND PATTERN GENERATOR

[75] Inventors: Stanley A. Dallas, Jr., Portland; Aubrey J. Erickson, Tigard, both of Oreg.

[73] Assignee: Thales Resources, Inc., Hillsboro, Oreg.

[21] Appl. No.: 172,447

[22] Filed: Jul. 18, 1980

[51] Int. Cl.³ .................................... H04M 7/00
[52] U.S. Cl. ............................ 358/94; 358/174; 364/829; 364/833; 364/840; 375/76
[58] Field of Search ............... 358/94, 174; 434/116; 340/407; 3/13; 128/76.5; 333/19; 307/264, 493; 364/828, 829, 839, 838, 837, 833, 840; 328/127; 378/27, 76; 84/DIG. 9, DIG. 10; 330/89, 279, 104

[56] References Cited

U.S. PATENT DOCUMENTS 3,007,259 11/1961 Abma et al. .................. 434/116
3,800,082 3/1974 Fish .
3,907,434 9/1975 Coles .
4,000,565 1/1977 Overby et al. .

OTHER PUBLICATIONS

R. M. Fish, "An Audio Display for the Blind", Mar. 1976, IEEE Transaction on Biomedical Engr., vol. BME-23, No. 2, pp. 144-154.

Primary Examiner—Robert L. Griffin
Assistant Examiner—Edward L. Coles
Attorney, Agent, or Firm—Schwartz, Jeffery, Schwaab, Mack, Blumenthal & Koch

[57] ABSTRACT

An apparatus for providing an audible representation of any data which can be represented in a format of M×N individual datum. Each datum can have individually specified properties. One application of this technique is to provide an audible representation of a visual scene. Since these data can readily be assimilated by the brain, they can provide either an aid to the visually handicapped or supplementary information to the normally sighted. A matrix of M×N pixels is generated in which distance along one spatial axis is represented by discrete sound frequencies and distance along the orthogonal axis is represented by the time lapse following a reference sound pulse. The light intensity of a pixel is represented by the amplitude of the sound at both a particular frequency and a particular time after the reference sound pulse is generated.

17 Claims, 5 Drawing Figures

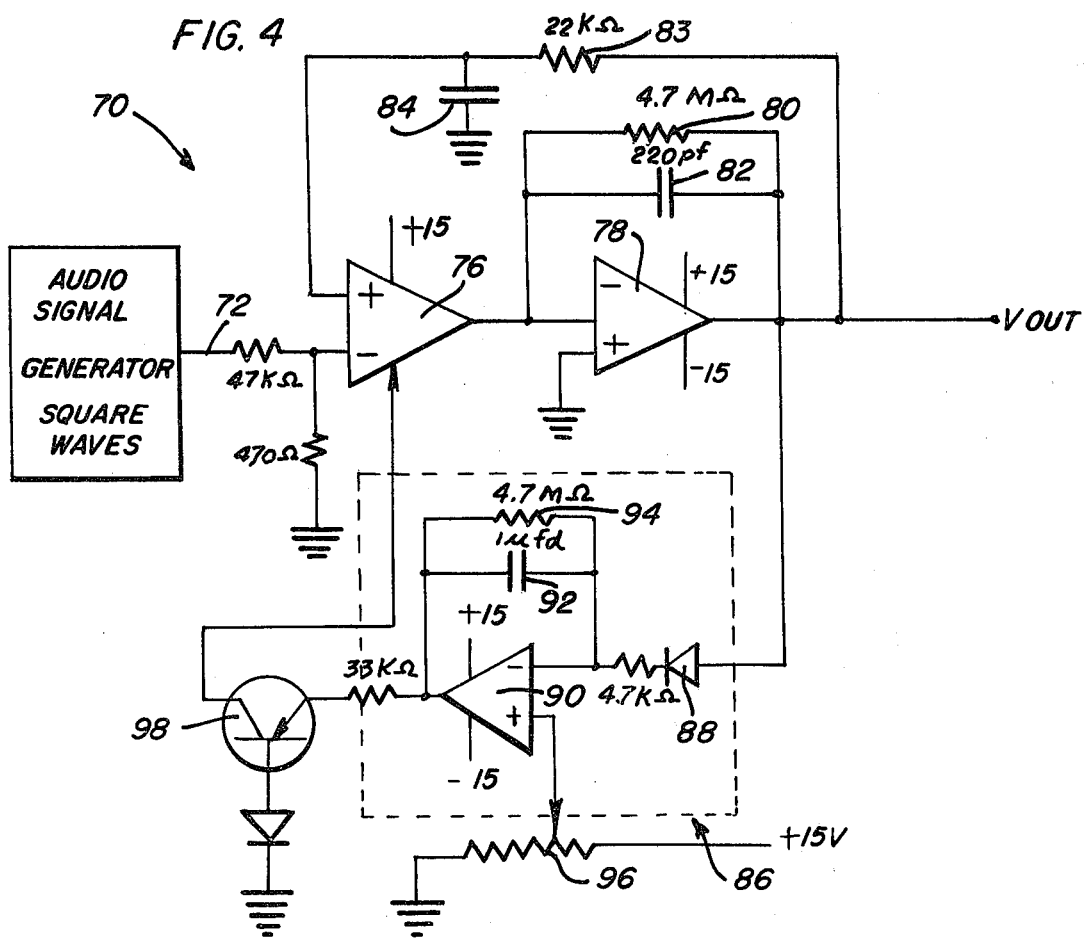
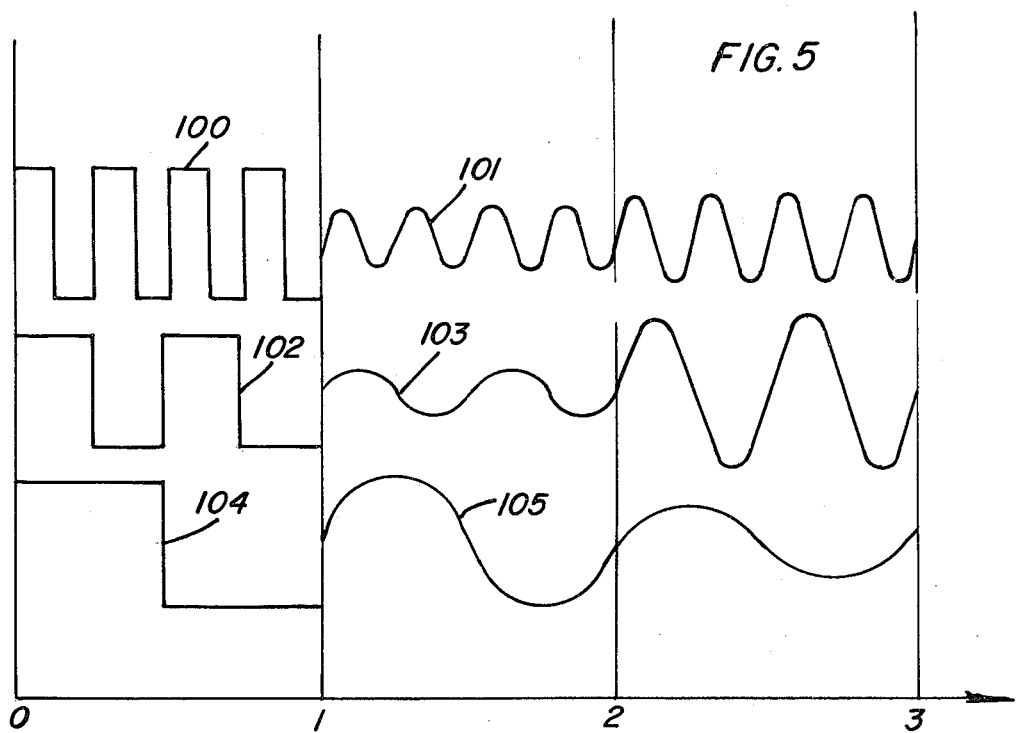

SOUND PATTERN GENERATOR

BACKGROUND OF THE INVENTION

1. Field of the Invention

This invention relates to providing a means of transforming any data which can be represented in a format of M×N individual datum, into an audible representation of these data. Each datum can have individually specified properties.

One application of this technique is to provide an audible representation of video data. Since these data can be readily assimilated by the brain, they can provide either an aid to the visually handicapped or they can provide supplementary visual information to normally sighted persons.

2. Discussion of Related Art

The problem of providing a source of sensory stimulation for sight impaired persons in an attempt to replace lost visual perception has been pursued for many years. One example of an attempt to solve the problem is the use of physical stimulators which are driven by an apparatus receiving visual stimuli. The physical stimulators can be placed on a certain area of the handicapped person's body and a pattern of stimulation is produced representative of the visual pattern which would ordinarily be seen.

Also, substantial work has been done in converting visual stimuli into an auditory display comprising patterns of sounds which the handicapped person can be taught to associate with certain visual stimuli. One example of such a device can be seen in U.S. Pat. No. 3,800,082, issued Mar. 26, 1974, to Fish. The Fish system provides an auditory display of two-dimensional patterns by use of a slow scan television camera for producing first and second voltages respectively indicative of the vertical and horizontal positions of the scan and a further voltage indicative of the intensity at each point of the scan and hence of the presence or absence of the pattern at that point. The vertical position of the scan is represented aurally by the frequency of the tone heard, the first voltage being used to control the frequency output of a VCO. The horizontal position of the scan is represented aurally by the interaural difference between two tones presented so that a point on the left side of a pattern is indicated by a relatively loud sound in the left ear. However, it is noted that a raster-type scan as used in Fish requires that the scanning time be of large duration in order to insure that the sound pattern range produced is within the audible frequency range of a human being.

U.S. Pat. No. 3,907,434, issued Sept. 23, 1975, to Coles, shows a sight system for producing binaural sound representative of the location of a visible object with respect to a listener, the system includes means for generating first and second time related signals of an audible frequency and a headset having two independently operable earphones which are connected to the signal generating means for reproducing sound in each of the earphones in response to each of the first and second signals, respectively. One apparent difficulty with the Coles invention is that the use of both ears is required to receive the visual stimulation. Accordingly, normal aural stimulation can no longer be received by the user.

U.S. Pat. No. 4,000,565, issued Jan. 4, 1977, to Overby et al, shows an apparatus for converting silent digital visual display characters into sequentially enunciated audible tones. The apparatus takes the output from a visual display, serially by character, and converts the serial characters into serially enunciated tone codes according to a given code format which is then reproduced through an output transducer so that the audible tones may be understood by the user. It should be understood that the Overby et al device does not attempt to simulate sight but merely provides a means for audible recognition and is thus limited in use.

SUMMARY OF THE INVENTION

One object of the present invention is to provide artificial monochromatic sight for the blind which also has the capability of distinguishing between colors, if desired.

A further object of the present invention is to provide a system whereby visual stimuli are transformed into audible second patterns representative of the scene depicted by the visual stimuli.

An even further object of the present invention is to provide a system wherein the visual stimuli are sensed by a camera and transformed from a serial output to a plurality of parallel channel outputs which produce a plurality of timed audible, variable intensity signals to simulate sight.

An additional object of the present invention is to provide a unique DC nulling integrator with constant output amplitude for use in the system of the present invention for transforming square wave inputs to sine wave outputs which circuit is capable of use in a frequency range equivalent to the normal human audible frequency range.

In accordance with the above objects, the system of the present invention utilizes a television camera system for generation of electrical signals which represent the visual image scanned by the system. The camera produces a 64×64 image matrix which is outputted in serial form and transformed to a 64 channel parallel output format by the system.

The audio signals required for the system are provided by an audio signal generator comprising a clock which drives two top octave generators. This provides the first 24 channel octave with subsequent octaves being derived by digital counter stages which divide the original frequency by two.

The sound channels provided by the audio signal generator are square waves and as such are not suitable for use as carrier signals. The square waves are converted to sine waves by two stages of a unique integration circuit. The sine waves are then transmitted to 64 modulators. At the modulators, the audio signals are modulated by the 64 parallel video signals. The modulated sound waves are then transmitted to a summing circuit and finally through a power amplifier to earphones.

At the end of the transmission of each set of 64 channels, a timing signal passes a new frame signal to the earphones to provide a timing signal to the listener indicating the presence of a new frame about to be transmitted.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is an electrical schematic diagram representation of one DC nulling integrator with constant output amplitude used in the square wave to sine wave convertor of the present invention.

FIG. 5 is a graphical representation indicating the timing sequence of the present invention.

DISCUSSION OF THE PREFERRED EMBODIMENT

Now with reference to the accompanying drawings, a sound pattern generator built according to the principles and concepts of the present invention will be described in detail.

Figure 1:
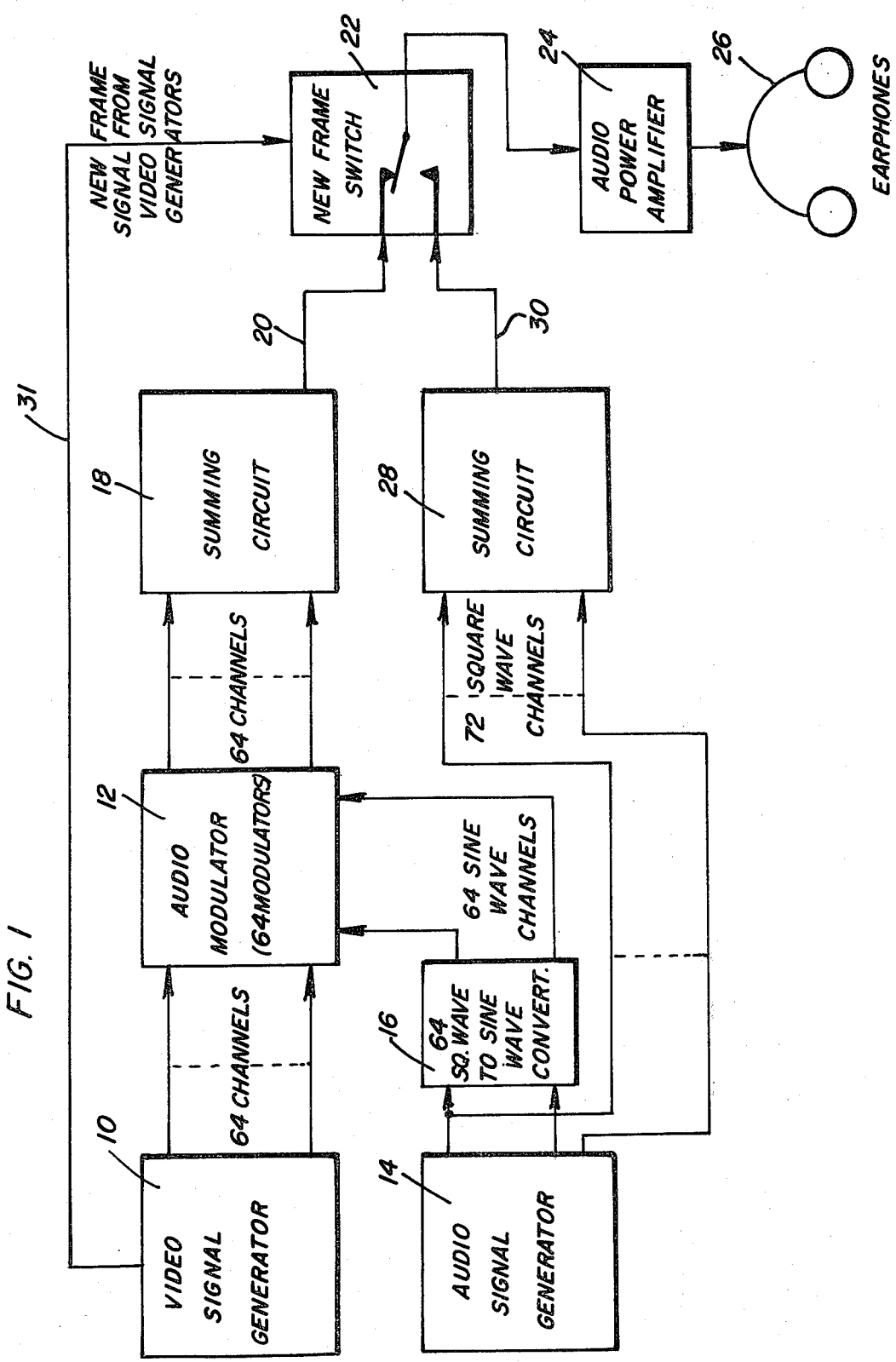
FIG. 1 is a block diagram representation of the sound pattern generator.

With particular reference to FIG. 1, it can be seen that the over-all system of the invention comprises a video signal generator 10 feeding audio modulator 12. Video signal generator 10 includes a video camera which can be any standardly available type producing, for instance a 64×64 matrix output accessed by a standard raster scan, in which case the video signal generator is operative to transform the raster scan into a 64 channel parallel output with the 64 channels representing 64 horizontal lines of the camera scanned from left to right. Each of the 64 channels outputted from video signal generator 10 is used to modulate a separate sine wave signal in audio modulator 12. The sine wave signals represent 64 discrete frequencies within the audible range and are generated by audio signal generator 14. The output of generator 14 is in the form of 64 discrete square wave functions, each of which is doubly integrated to produce the desired sine wave functions. Integration is carried out by square wave to sine wave convertor 16 with contains 64 channels for integrating the 64 inputted square waves. Each of the 64 channels of convertor 16 comprises two series connected integrating circuits for producing the desired output.

The output of audio modulator 12 is in the form of 64 discrete amplitude modulated signals which are inputted to a summing circuit 18. It is noted that the individual modulators of modulator 12 are conventional modulator circuits in which the audio signals are amplitude modulated by the video signals from the video signal generator 10. Amplitude modulation is the preferred modulation technique as it generates minimal sum and difference side bands above and below the carrier frequency to interfere with the other 64 channels. It is also noted that while the side bands will overlap the other carrier frequencies, the listener's brain will be able to unscramble the overlap to determine an accurate signal and thus additional filtering of the 64 channels should not be necessary except in severe cases.

The 64 channels inputted to summing circuit 18 are added to produce a single multi-frequency output on line 20. The output on line 20 therefore contains a signal having characteristics analogous to the horizontal and vertical characteristics of the video image seen on the video camera of video signal generator 10. Vertical differences are discernible by frequency differences of the 64 channels, while horizontal characteristics are discernible by the time lapse that a specific tone is heard after the beginning of the receipt of the carrier signal. Also, intensity of specific images is discernible by the level of amplitude modulation of a specific carrier frequency. This signal is then transmitted through new frame switch 22 and audio power amplifier 24 to headphones 26 which are worn by the user.

It is evident from the above that each frame seen by the video camera of generator 10 is transmitted by the 64 channels inputted to audio modulator 12 has a specific time duration. Accordingly, it is necessary to provide the listener with a signal indicating the beginning of a new frame. This signal is produced by summing 72 square wave outputs of audio signal generator 14 in summing circuit 28. Accordingly, summing circuit 28 outputs onto line 30 a single constant amplitude signal resulting from the combination of 72 discrete frequency signals in the audible range. At the end of each frame, video signal generator 10 produces on line 31 a single pulse signal indicating that all the information in a single frame has been outputted. The signal on line 31 is operative to cause new frame switch 22 to move from the normally closed position connecting line 20 to power amplifier 24 to the alternately closed position wherein line 30 is connected to power amplifier 24. Accordingly, at the beginning of each new frame, the listener hears essentially an impulse indicating that the next signal to be heard represents a new frame image and thus the next sounds heard represent the left hand side of the image as the image is scanned from left to right.

Figure 2:
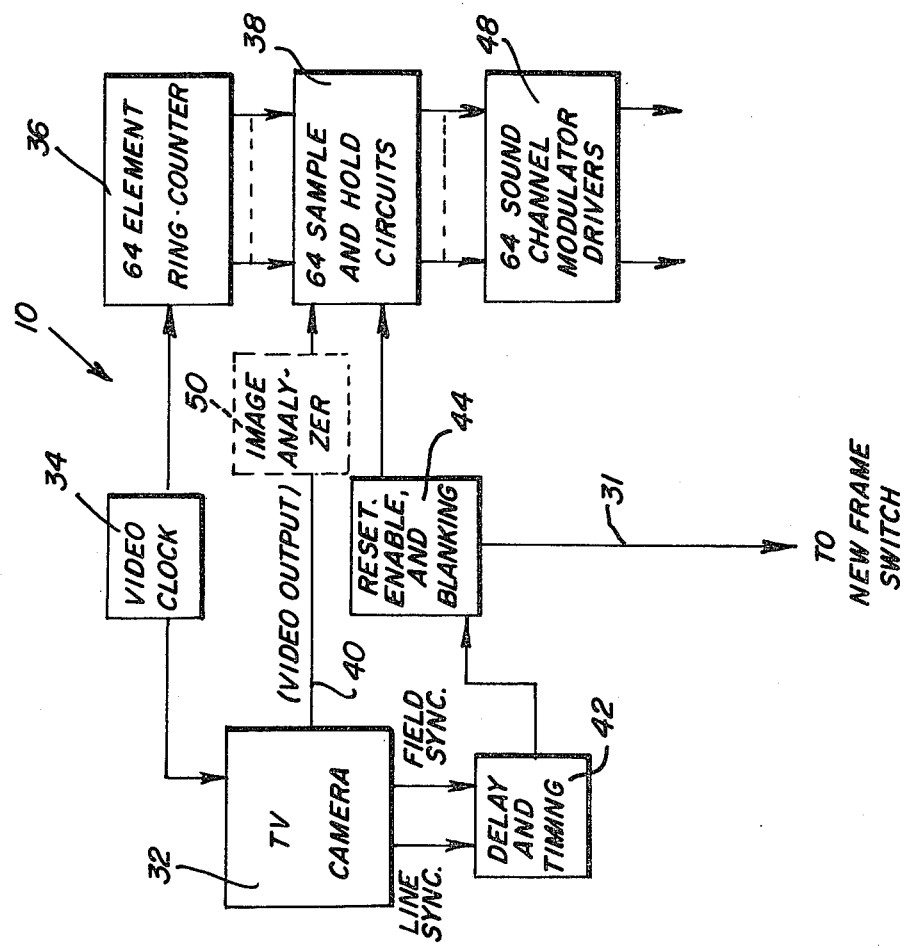
FIG. 2 is a block diagram representation of the video signal generator of the present invention.

Now with reference to FIG. 2, the video signal generator 10 will be described in more detail. The camera 32 is that video camera which was mentioned above and can comprise any standardly available camera system. One example of such a camera would be the IPIC 64×64 matrix array camera which has a resolution of 4,096 picture points, the array having a square matrix of 64×64 photo-diodes. Clearly, the above discussion relates to use of such a camera having a 64×64 matrix. Another camera which is readily adaptable for use in the present invention is the Periphicon Type 511 Optical Image Digitizer. The Type 511 produces a 32×32 pixel array and thus has less resolution than the IPI camera. Obviously, the type of camera chosen would be dependent upon the resolution desired and the camera frequency response. It is noted that the present system can easily be used for infrared or ultra violet detection given that the camera used is capable of response in the appropriate frequency ranges. The video camera 32 utilizes a standard raster scan technique for outputting information from the individual pixels. The system used for transforming the serial raster scan output into 64 parallel channel outputs will now be described. The system is similar to that used by Chodil for displaying a television picture on an M×N gas display panel and is discussed in "Good Quality TV Pictures Using a Gas Discharge Panel" IEEE Transactions on Electron Devices, vol. ED-20, No. 11, November 1973, pp. 1098-1102. A high frequency video clock 34 sequentially accesses each of the pixels of camera 32 in the predetermined raster scan scheme associated with the camera. At the same time, clock 34 drives a 64 element ring counter 36 which sequentially enables each of 64 sample and hold circuits which are located in block 38. Information for each of the pixels is sequentially outputted on line 40 and stored in individual sample and hold circuits. By the proper physical orientation of camera 32, it is possible to produce a pixel output which progresses from the bottom to the top of the screen and from left to right across the screen. Accordingly, the contents of the sample and hold circuits can be outputted simultaneously, thus changing the serial input to a parallel output. In this manner, 64 parallel channels can be transmitted element by element from the sample and hold circuits 38 with elements occupying similar positions in each channel being emitted simultaneously. The delay and timing circuit 42 receives line synchronization and the field synchronization signals formed in camera 32. The line synchronization signal is transmitted to the reset, enable and blanking circuits 44 to cause the previously stored signals in block 38 to be transmitted and all the sample and hold circuits to be reset, thus enabling them to receive the next line of sequential inputs. When the entire single frame of camera 32 has been transmitted through line 40, the camera is reset and emits the field synchronization signal to circuit 42. The field synchronization signal is passed through the reset, enable and blanking circuit where it is properly conditioned and passed through line 31 to new frame switch 22 shown in FIG. 1.

In operation, it will be understood from the above that video clock 34 continuously runs causing a stream of serial pulses to be passed through line 40 to the sample and hold circuit 38. Ring counter 64 sequentially enables each of the 64 sample and hold circuits in block 38 so as to receive one of the serial outputs. Once a complete line of outputs has been emitted as indicated by a line sinc signal received from the camera 32, the stored values in sample and hold circuits of block 38 are simultaneously passed to the modulator drivers 48 contained in audio modulator 12. The timing of the transmission of these values together with resetting of the sample and hold circuits themselves is controlled through blocks 42 and 44. When one entire frame has been transmitted through line 40, a field sinc signal is received by block 42 together with the line sinc signal and accordingly a pulse is emitted on line 31 at the same time as sample and hold circuits 64 are reset to receive the first inputs from the next frame.

It is apparent that each entire frame is passed through line 40 and thus line 40 provides an access point at which the video picture can be conditioned in any appropriate manner using standard available digital image analyzing techniques. An image analyzer block 50 can thus be inserted in line 40 if desired through image analyser techniques and the critical elements of the visual scene can be enhanced, projected or processed in any desirable manner.

Figure 3:
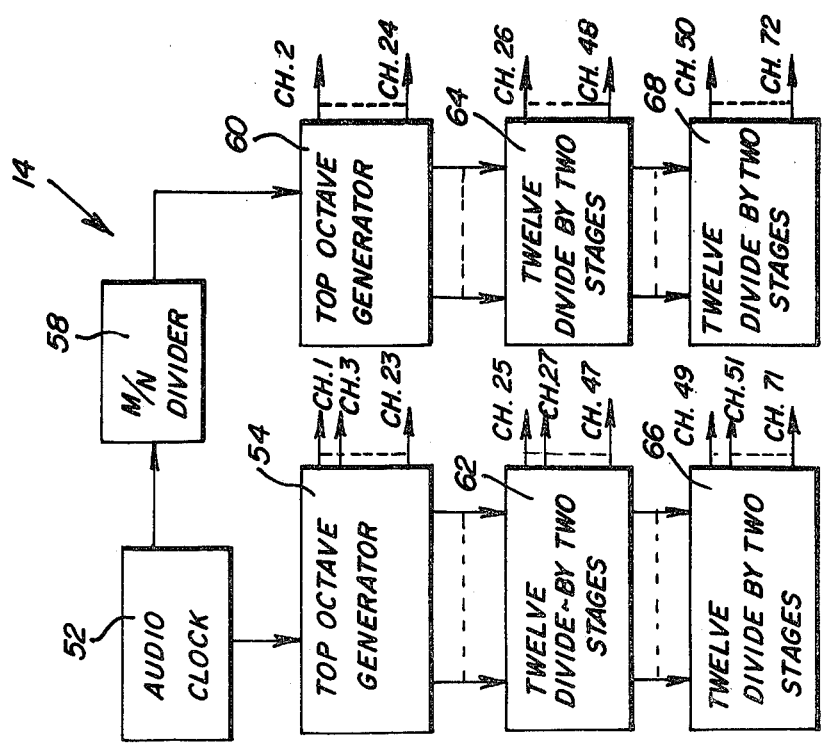
FIG. 3 is a block diagram representation of the audio signal generator of the present invention.

Referring to FIG. 3, the audio signal generator 14 will be seen to include an audio clock 52 which drives a top octave generator 54. Top octave generator 54 can be a standard device such as the MOSTEK 5024-0 and provides the odd numbered 12 channels, including channels 1 through 23. The output of clock 52 is also passed through a divider 58 which feeds a second top octave generator 60 which produces even numbered channels 2 through 24. Channel 1 from top octave generator 54 is a 16 kilohertz signal with each of the other outputs from top octave generator 54 being 1/12 of an octave below that. Channel 2, which is the first output from top octave generator 60 is 1/24 of an octave below channel 1 and each of the other outputs from top octave generator 60 and 1/12 of an octave apart thus making each of the channels 1 to 24 1/24 of an octave apart. Channels 25 through 48 are generated by dividing the outputs of top octave generators 54 and 60 by two as shown in divide by two stages 62 and 64. Similarly, channels 49 through 72 are produced by dividing channels 25 through 48 by two in stages 66 and 68. Channels 1 through 64 are fed to square wave to sine wave converter 16 and integrated therein to produce 64 sine wave outputs which are 1/24 of an octave apart in the audible frequency range.

The square wave to sine wave converter 16 includes in each channel two DC nulling integrators. Double integration of the square waves reduces the third harmonic in the square wave by a factor of 9 thus providing a usable sinusoidal carrier signal at the input frequency. One of the nulling integrators is shown in detail in FIG. 4. The nulling integrator is generally labelled 70. Integrator 70 integrates its input signal, nulls out the DC component of that signal, and provides a constant amplitude output regardless of the input frequency over the useful operating range of the circuit.

An input line 72 is connected to one of the channels from the audio signal generator and passes that signal to the inverting input of an operational transconductance amplifier 76, such as a CA 3094 or CA 3080. The transconductance amplifier 76 provides a variable gain output and acts as a current source to operational amplifier 78, the inverting input of which is connected to the output of amplifier 76. A 4.7 M ohm resistor 80 is connected between the output and input of operational amplifier 78 to stabilize the operational amplifier and a 220 pf integrating capacitor 82 is also connected from the output to the inverting input of amplifier 78 so that the amplifier acts in an integrating mode. The non-inverting input of operational amplifier 78 is connected to ground. The integrated output of amplifier 78 is fed back through a low pass filter comprising 22 K ohm resistor 83 and 10 microfarad capacitor 84 to the non-inverting input of transconductance amplifier 76. The output of operational amplifier 78 is also fed to a peak detector 86 which is used to control the gain of transconductance amplifier 76. Peak detector 86 comprises a diode 88 having its anode connected to the output of amplifier 78 and cathode connected to the inverting input of operational amplifier 90. The output of operational amplifier 90 is fed back to the inverting input through 1 microfarad capacitor 92 and 4.7 M ohm bleed resistor 94 so that amplifier 90 operates in the integrating mode. A reference voltage is supplied by potentiometer 96 to the non-inverting input of amplifier 90. The output of operational amplifier 90 is fed to the emitter of PNP transistor 98, the collector of which is connected to control gain of transconductance amplifier 76.

In operation, the amplified output of transconductance amplifier 76 is integrated by operational amplifier 78 and fed back through the low pass filter comprising resistor 83 and capacitor 84 to null out the DC component of the input signal on line 72. Since the amplifier 78 inverts the output from amplifier 76, the signal fed back to the non-inverting input of amplifier 76 is already negative thus providing negative feedback. The output from amplifier 78, having the DC component nulled, is passed to the peak detector 86 which compares the output signal amplitude to the amplitude reference signal from potentiometer 96. Amplifier 90 continues to increase the drive to the PNP transistor 98 and consequently continues to increase the gain of amplifier 76 until the output amplitude reaches the output amplitude reference value set at potentiometer 96. Any further increases in output amplitude will result in a decrease in gain of amplifier 76. Therefore, the peak of the output voltage stabilizes at the output reference voltage. Since the nulling integrator circuit does not require any calibration, is insensitive to input signal amplitude variations, and cancels any DC components of the input signals, it is readily suited to mass production.

These circuits can also be used in a variety of applications other than the present invention. The circuit is particularly useful in the synthesis of musical notes. For example, top octave generators and simple digital counters can provide square waves of frequency used in the synthesis of musical notes. A single stage of integration following the square waves produces a triangular wave. One additional integration produces a parabolic wave, which is a sine wave with 3.6% third harmonic distortion. This amount of sine wave distortion is virtually undetactable on an oscilloscope trace, since the accuracy limits of such traces are around 5%. Additional stages of integration can be used to further decrease harmonic content.

A musical synthesizer could use 100 of these circuits with a top octave generator and digital counters to produce 50 equal amplitude sine waves. The output amplitude for all the stages can be controlled by a single output reference amplitude. Each channel would also be locked to the phase of the oscillator driving the top octave generator. If the oscillator drifts, so does the top octave generator output, the counter outputs, and the integrator outputs. Thus, the signals necessary for electronic organs, pianos, music synthesizers, etc., can all be readily achieved when the integrator is used with top octave generators and digital counters. Since all these components are relatively inexpensive, the fabrication costs of these instruments can be very low.

The circuit configuration 70 of FIG. 4 has been used for signals in the one kilohertz to 20 kilohertz range. This operating range can be altered by simply changing the capacitor values in the circuit.

With reference to FIG. 5 and again referring to FIG. 1, it can be seen that the timing diagram of FIG. 5 represents signals received by the earphones 26. The abscissa of the graph in FIG. 5 represents time periods beginning with a new frame signal while the ordinate of the graph shows amplitudes of 3 of the channels with the three channels being one octave apart. During the first time period represented in FIG. 5, the new frame switch 22 of FIG. 1 is positioned in the normally closed position by a signal which is emitted from camera 32 on the field sinc line and passed through blocks 42 and 46. Accordingly, all of the square waves generated by audio signal generator 14 are summed in summing block 28 to produce a pulse transmitted to earphones 26 signalling the beginning of a new frame. This pulse is represented by the three square waves shown in the first time interval of the graph in FIG. 5. These square waves are labelled 100, 102 and 104 and are associated with sinusoidal waves 101, 103 and 105 respectively. The sinusoids 101, 103 and 105 are generated by integration of the associated square waves in convertor 16 and modulated by the 64 channel outputs of video signal generator 10 to produce the amplitude modulated signal shown in FIG. 5. It should be clear from the foregoing discussion that these sinusoids are added together with the other channels from the audio modulator and summed in summing circuit 18 to produce a single signal transmitted to the earphones 26. With practice, the user can be taught to conceptualize a field in which the vertical axis of the field is differentiated by high or low frequency tones and wherein the horizontal axis of the field is represented by a real time scan starting with the new frame pulse generated by summing circuit 28. As the time sweep progresses, the individual tones increase or decrease in amplitude to represent objects present in the field and the shape of these objects can be discerned by such variations.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A system for producing a sound pattern representative of the image produced by a field of electromagnetic radiation, said system comprising:
   receiver means comprising a two dimensional array of data elements for receiving a spectrum of electromagnetic radiation and outputting information signals in response to said radiation;
   transformation means for accepting said information signals and outputting said information signals on a plurality of parallel channels;
   audio signal generator means for producing a plurality of discrete frequency carrier signals in the audible range;
   modulator means for modulating each of said discrete carrier signals with a separate one of said plurality of channels outputted from said transformation means; and
   transducer means connected to said modulator means for converting said modulated carrier signals to audible signals.

2. The invention as defined in claim 1 wherein said receiver means comprises a video camera means for receiving an image in an array having a pixel matrix, and camera output means for serially outputting the information received by each pixel of said matrix.

3. The invention as defined in claim 2 wherein said transformation means includes serial to parallel convertor means for receiving said serial output and converting said serial output into a parallel output forming said plurality of channels.

4. The invention as defined in claim 3 wherein said serial to parallel convertor includes a clock circuit connected to said camera output means for commanding access to each of said pixels in a raster scan pattern; a plurality of sample and hold circuits for receiving information from individual pixels and storing said information, a ring counter for sequentially accessing ones of said sample and hold circuits for receiving information from only a single pixel, and timing circuitry for outputting the information from said sample and hold circuits to form said parallel channels.

5. The invention as defined in claim 1 wherein said receiver means outputs said information signals in frames, one frame at a time, each frame comprising an information signal from each data element, and further including new frame signal producing means associated with said received means for outputting a new frame signal each time a new frame is output.

6. The invention as defined in claim 5 and further including an audible frame signal producing means responsive to said new frame signal for transmitting an audible signal to said transducer means upon the receipt of said new frame signal.

7. The invention as defined in claim 6 wherein said audible frame signal producing means includes a summing circuit having an input receiving a plurality of discrete frequency carrier signals from said audio signal generator and producing an output constituting the sum of the received signals, and switch means for receiving said new frame signal and passing the output of said summing circuit to said transducer means upon receipt of said new frame signal.

8. The invention as defined in claim 1 and further including wave shaping circuit means for receiving the output of said audio signal generator and shaping said discrete frequency signals to produce sine wave signals, said wave shaping circuit means comprising a plurality of nulling integrator circuit means, each of said discrete frequency signals being passed through at least one nulling integrator circuit means for cancelling the DC component of said discrete frequency signal, integrating said frequency signal and outputting a signal having a predetermined amplitude.

9. The invention as defined in claim 8 wherein each of said nulling integrator circuit means comprises a gain controllable amplifier having an input for receiving one of said discrete frequency signals and an output, integrator means having an input receiving the output of said gain controllable amplifier and having an output, negative feed back means connected from the output of said integrator means to the input of said gain controllable amplifier, said negative feedback means including a low pass filter for nulling the DC component of the input signal; and peak detector means connected to the output of said integrator means for detecting the peak of the signal outputted from said integrator means and controlling the gain of said gain controllable amplifier.

10. The invention as defined in claim 9 wherein said peak detector means includes a diode connected to the output of said integrator means, reference voltage means for producing a reference voltage, and integrate and store means for intergrating and storing the difference between the output of said diode and said reference voltage and controlling the gain of said gain controllable amplifier in accordance with said difference.

11. A system for transforming frames of information stored in a two-dimensional matrix array into audible data frames in which signals having a plurality of audible frequencies are used to transmit said stored information and in which the frequencies represent one axis of the array and the time duration of the audible data frames represents the other axis of the array, said system comprising information frame generation means comprising a plurality of discrete points arranged in a two-dimensional matrix array for receiving electromagnetic waves and generating information in response thereto; scanning means for scanning the elements of said matrix and outputting the information contained therein in serial form; frame reference signal generation means for generating a signal indicative of the time duration of an audible data frame thereby defining said other axis of the array; serial to parallel convertor means for receiving said serial information and transforming it into a plurality of parallel channels of information; and utilization circuitry means for receiving said parallel channels and said frame reference signal and including transducer means for outputting an audible signal in response to said frame reference signal and a multiple frequency signal in response to said parallel channels.

12. The invention as defined in claim 11 wherein said utilization circuitry means includes an audio signal generator for producing a plurality of discrete frequency carrier signals; modulator means for modulating each of said carrier signals by one of said parallel channels of information; and summing circuit means for summing each of said modulated signals.

13. The invention as defined in claim 12 and further including wave shaping means for receiving the output of said audio signal generator and forming each of said carrier waves into sine waves, said wave shaping means including a plurality of nulling integrator means for nulling the DC component of each of said carrier waves and integrating each of said carrier waves.

14. A nulling integrator circuit for use in wave shaping of signals in a predetermined frequency range, said circuit comprising a gain controllable amplifier having a first input for receiving the signal to be shaped and an output, integrating circuit means for integrating the output of said gain controllable amplifier, said integrating circuit means including an output; negative feedback circuit means containing a low pass filter connected from the output of said integrator means to the input of said gain controllable amplifier for nulling out the DC component of the input signal to said gain controllable amplifier; and the peak detector means connected to the output of said integrator means for controlling the gain of said gain controllable amplifier in response to the amplitude of the output of said gain controllable amplifier.

15. The invention as defined in claim 14 wherein said peak detector circuit means includes reference signal generation means for generating a reference signal, a diode having its anode connected to the output of said integrator means and a peak integrator means for receiving the output of said diode and said reference signal, forming the difference between the output of said diode and said reference signal, integrating said difference and controlling the gain of said gain controllable amplifier independent upon said difference.

16. The invention as defined in claim 15 wherein said peak integrator means comprises an operational amplifier having a non-inverting input connected to said reference signal generation means and having an inverting input connected to the output of said diode, and including an integrating capacitor connected between the output of said operational amplifier and said inverting input and a bleed resistor connected in parallel to said integrating capacitor.

17. The invention as defined in claim 16 wherein the output of said peak integrator means drives a transistor means acting as a current source to said gain controllable amplifier.

* * * * *